(12) United States Patent
Ho et al.

(10) Patent No.: US 7,921,090 B2
(45) Date of Patent: Apr. 5, 2011

(54) CLUSTER DELTA PUSH

(75) Inventors: Eugene Ho, San Ramon, CA (US);
Kotaro Ono, Foster City, CA (US); Neil Macnaughton, Los Gatos, CA (US);
Michael Zoll, Mountain View, CA (US);
Herbert van den Bergh, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 344 days.

(21) Appl. No.: 11/450,179

(22) Filed: Jun. 9, 2006

(65) Prior Publication Data

US 2007/0288463 A1 Dec. 13, 2007

(51) Int. Cl.
*G06F 17/00* (2006.01)
*G06F 7/00* (2006.01)
*G06F 15/16* (2006.01)

(52) U.S. Cl. .................. 707/704; 707/705; 709/210

(58) Field of Classification Search ............... 707/8, 10, 707/9, 704; 709/210
See application file for complete search history.

(56) References Cited

U.S. PATENT DOCUMENTS

| | | | |
|---|---|---|---|
| 6,965,893 B1 * | 11/2005 | Chan et al. | 707/8 |
| 7,233,947 B2 * | 6/2007 | Lomet | 707/8 |
| 7,236,974 B2 * | 6/2007 | Bhattacharjee et al. | 707/8 |
| 2002/0095403 A1 | 7/2002 | Chandrasekaran et al. | |
| 2002/0099729 A1 | 7/2002 | Chandrasekaran et al. | |
| 2003/0004945 A1 * | 1/2003 | Teng et al. | 707/8 |
| 2004/0205066 A1 * | 10/2004 | Bhattacharjee et al. | 707/8 |
| 2004/0225742 A1 * | 11/2004 | Loaiza et al. | 709/229 |
| 2005/0065907 A1 | 3/2005 | Chandrasekaran et al. | |
| 2006/0195648 A1 | 8/2006 | Chandrasekaran et al. | |
| 2006/0212573 A1 * | 9/2006 | Loaiza et al. | 709/225 |
| 2006/0265414 A1 | 11/2006 | Loaiza et al. | |
| 2006/0265420 A1 | 11/2006 | Macnaughton et al. | |
| 2007/0168319 A1 | 7/2007 | Chandrasekaran et al. | |
| 2007/0174541 A1 | 7/2007 | Chandrasekaran et al. | |

* cited by examiner

*Primary Examiner* — Debbie Le
*Assistant Examiner* — Bao G Tran
(74) *Attorney, Agent, or Firm* — Vista IP Law Group, LLP.

(57) ABSTRACT

Methods and apparatuses for providing access to data in a cluster database are described. Embodiments of the invention include identifying situations in which many nodes require relatively equal access to a data block, and taking appropriate measures to improve the performance of the system in these situations. For example, a node may automatically downgrade its lock from an X lock to an S lock as soon as it has finished a modification of the data. S locks are sent to other nodes in the system as soon as a modification is complete. Modifications to the data are also sent to other nodes in the system as soon as a modification is complete. Depending on the size of the data modification, the entire data block may be sent, or only the modifications to the data may be sent.

38 Claims, 6 Drawing Sheets

CLUSTER DELTA PUSH

FIELD

Embodiments of the invention relate to computer systems, and more particularly to data modification in cluster database systems.

BACKGROUND OF THE INVENTION

Complex database systems often need to access objects stored on remote databases. For example, a bank may need to transmit a financial transaction across several database servers in order to maintain integrity in their records. As another example, a shipping company may need to send package tracking information across several systems in order to make this data available to its customers.

A "cluster" is a system in which multiple database servers ("instances" or "nodes") have access to the same database. A database to which the multiple nodes have access is referred to herein as a "cluster database." The persistent storage that stores a cluster database is accessible by all nodes in the cluster. Typical database objects such as persistent tables, packages and procedures will be accessible from any node of the cluster database.

In a cluster database, one or more nodes may cache database information in a private area accessible only to that instance, e.g. in its volatile memory. For example, in a database cluster containing nodes N1, N2, and N3, a particular block of data may be cached on N1 and N3 in their respective volatile memories, but may not be cached on N2.

In order to access a block of information stored in the central database, a node may be granted a read lock, known as a "shared" or "S" lock; or a write lock, known as an "exclusive" or "X" lock. Several nodes may read the same block of information at once, and thus, several nodes may possess S locks for the same block of data. However, during a write operation, only the node which is modifying the block data may access the block. Thus, when one node possesses an X lock on a block of data, no other node may possess either an X lock or an S lock on that data block.

For each data block in the database, one node may be designated the Master node for that particular data block. The master node is responsible for coordinating access to the data block by granting and revoking X and S locks for the data block.

Oftentimes, one particular node will need to modify a certain data block repeatedly. This situation is common enough that current read-write protocols have been developed to optimize performance in this situation.

Thus, in existing systems, when a particular node, such as N1, wishes to modify a data block, the node will send a message to the appropriate Master node. The Master node is aware which other nodes in the system currently possess S locks on the data block, and the Master sends a message to these nodes to release their S locks. These nodes store local copies of the data block in their caches and release their S locks. These nodes then inform the Master that they have released their locks, and the Master then grants an X lock to N1.

Once in possession of the X lock, the node N1 modifies the data block. Because it is anticipated that N1 will modify the same data block in the near future, N1 does not release the X lock at this time.

Because N1 holds an X lock on the data block, other nodes who wish to read the data block cannot be granted an S lock. When another node requests an S lock from the Master node, the Master node redirects the requests to N1, who sends an updated copy of the data block to the requesting node to be stored in its local cache. N1 may continue to update the data block as long as it holds the X lock.

After N1 has received a predetermined number of requests for the data block, it is assumed that it is no longer efficient for N1 to possess the X lock. N1 will then release the X lock, allowing other nodes to obtain locks for the data block. For example, in one particular implementation, N1 may hold the X lock until it has received 10 requests for the data block. Once N1 receives the tenth request, it releases the X lock, and other nodes may obtain X or S locks for the data block.

Such a protocol has been optimized for a situation in which one node updates a particular data block repeatedly. However, in a situation where several nodes must read and write to the block frequently, this protocol may be inefficient. In particular, when one node holds an X lock, all read requests from other nodes in the system stall. Thus, it is desirable to implement an improved method for accessing data stored in a database, in a situation where many nodes require access to the same data block.

SUMMARY OF THE INVENTION

Methods and apparatuses for providing access to data in a cluster database are described. Embodiments of the invention include identifying situations in which many nodes require relatively equal access to a data block, and taking appropriate measures to improve the performance of the system in these situations. For example, in such situations, a node may automatically downgrade its lock from an X lock to an S lock as soon as it has finished a modification of the data. As another example, in such situations, S locks are sent to other nodes in the system as soon as a modification is complete. As yet another example, data updates are sent to other nodes in the system as soon as a modification is complete. If the modification to the data is large, the entire data block may be sent to the other nodes in the system. However, if the data modification is small, only the modifications to the data may be sent to the other nodes in the system.

BRIEF DESCRIPTION OF THE DRAWINGS

The invention is illustrated by way of example and not limitation in the figures of the accompanying drawings, in which like references indicate similar elements and in which.

DETAILED DESCRIPTION

Methods and apparatuses for providing access to data in a cluster database system are described. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those skilled in the art. Thus, the invention can include any variety of combinations and/or integrations of the embodiments described herein.

In some implementations, the invention includes systems and methods for expediting access to data when a plurality of nodes require access. After a first node has finished modifying a data block, the first node immediately downgrades its lock from an exclusive X lock to a shared S lock. The changes to the data may be immediately transmitted to other nodes in the system, and other nodes in the system may immediately be granted shared S locks on the data block.

Process Flow

Figure 1:
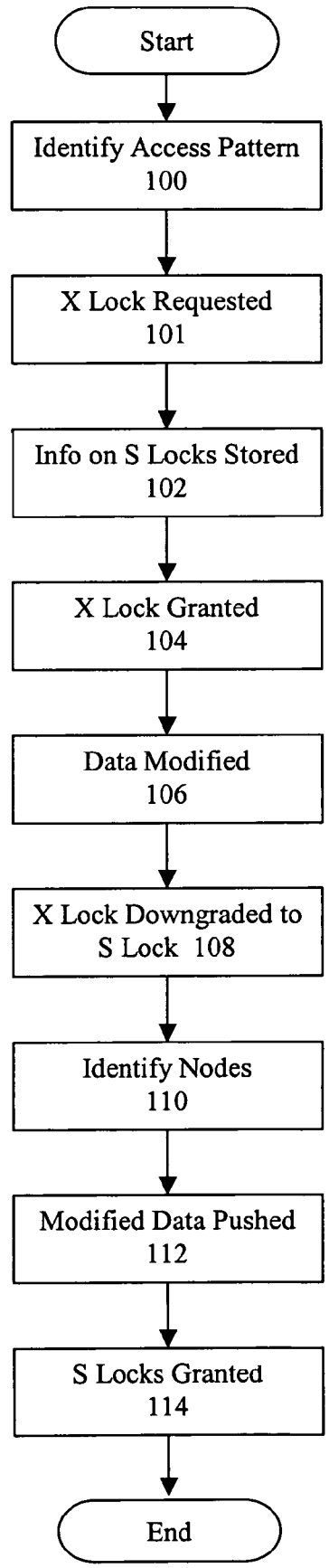
FIG. 1 is a flow chart illustrating a method for providing access to a data block.

FIG. 1 is a flow chart illustrating a method for providing access to data in a cluster database system. As shown in FIG. 1, the method may begin in step 100, wherein an access pattern may be identified. The access pattern identified may be an access pattern in which a plurality of nodes require a relatively equal number of reads and/or writes for a particular data table or data block. The access pattern may be identified, for example, based on performance metrics and other statistics for the system. Methods for identifying such an access pattern are described, for example, in co-pending U.S. patent application Ser. No. 11/132,807, entitled "Determining Affinity in a Cluster," filed on May 18, 2005, which is incorporated herein by reference in its entirety.

When it is determined that a plurality of nodes require relatively equal access to a particular data table or data block, a flag or other variable may be set for that data block or database. The flag indicates that a typical data access protocol will likely be inefficient, and that an alternate data access protocol will now be used for the data table or data block. The alternate access protocol that is used is described in steps 101-114.

In step 101, an X lock may be requested by a node in the system. The X lock is requested for a particular data block by a node N1, which wishes to modify the data block.

At the time the node N1 requests the X lock, other nodes in the system may hold S locks for the same data block. In step 102, information describing existing S locks may be stored. The information stored may identify the nodes that currently hold S locks on the data block. The information may be stored, for example, by the Master node, or elsewhere in the system.

The nodes that hold S locks may copy the data block into their local caches, and may then release their S locks. In step 104, an X lock may be granted to the node N1 which wishes to modify the data block.

In step 106, the data may be modified by the node N1, and in step 108, the X lock belonging to node N1 may be downgraded to an S lock. This downgrade occurs as soon as node N1 has finished modifying the data block. Node N1 does not wait for any other node to request access to the data block.

In step 110, the nodes that recently held an S lock are identified, for example, by the Master node using the information that was stored in step 102. In step 112, a data update may be pushed to the identified nodes. If the changes to the data are relatively large, the data update may include the entire modified data block. However, if the changes to the data are relatively small, the data update may include only the modifications, or the "delta." Transmitting only the delta may allow the information to be transmitted through open interconnect channels, which handle the transmission of short messages. By using the interconnect channels to transmit the delta, it may be unnecessary to coordinate the transmission of data using Direct Memory Access (DMA), a method for sending large blocks of information between the memories of different machines. By avoiding DMA and using open interconnect channels, the performance of the system may be improved.

The threshold that separates small changes to the data block from larger changes to the data block may be input, for example, by a database administrator. Alternatively, the threshold may be automatically or electronically adjusted based on the performance of the system and other statistical metrics. As yet another alternative, the threshold may be set to be the maximum amount of data that may be transmitted through the interconnect channels.

In step 114, S locks may be granted to the identified nodes. The S locks may be granted, for example, by the Master node, when it is determined that the modification of the data block is complete. The identified nodes do not need to request an S lock from the Master node.

Downgrading the X lock to an S lock as soon as modifications to the data are complete may improve performance, because read requests made after the modification do not stall while waiting for the X lock to be released. Similarly, transmitting a data update and granting S locks to the appropriate nodes may improve performance, because the appropriate nodes do not need to make an explicit request for the S lock and the data. In addition, transmitting only the delta of the data modifications whenever possible may improve the performance of the system, not only because less data is being transmitted, but also because an interconnect channel may be used to transmit the data.

Cluster Database System

Figure 2:
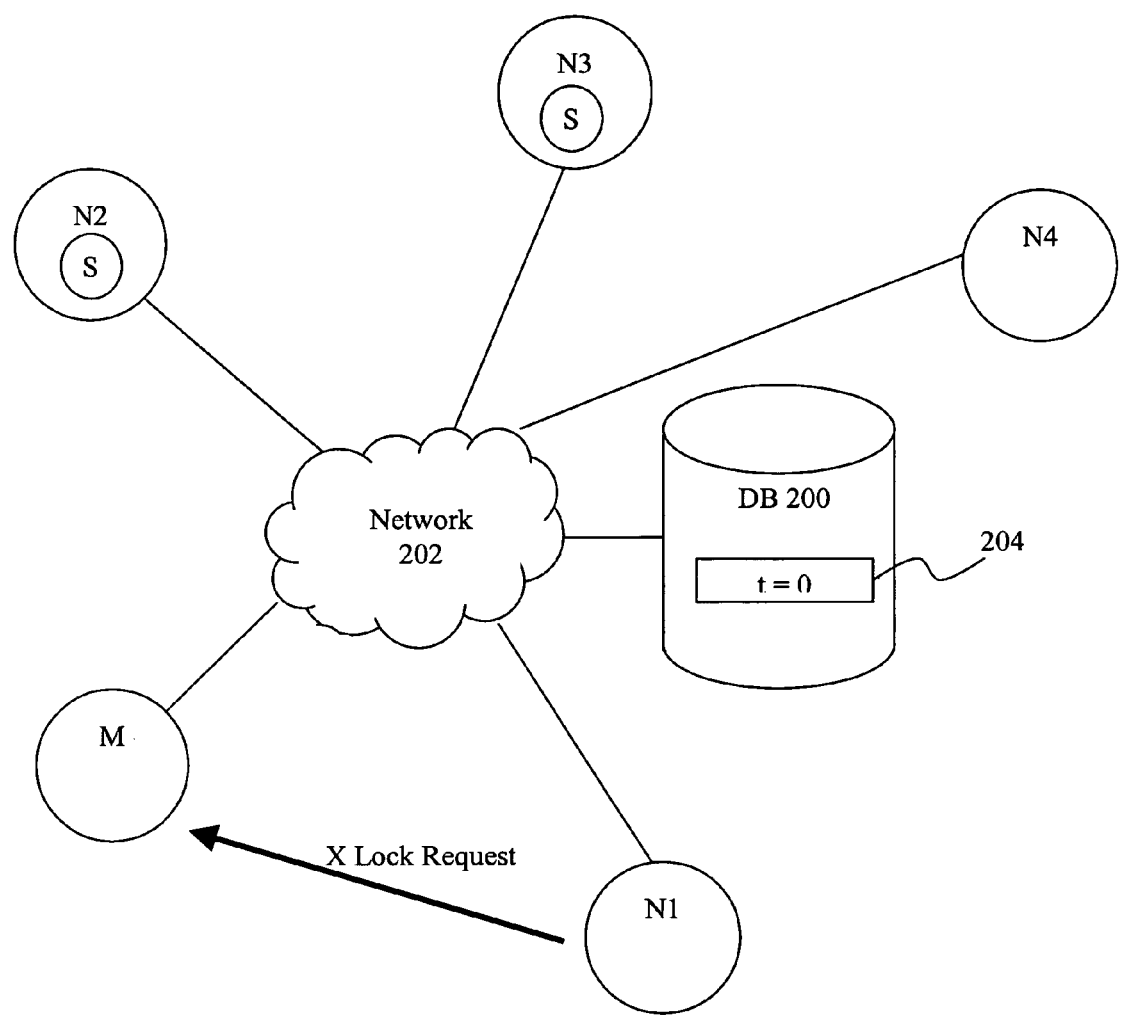
FIG. 2 is a flow chart illustrating a cluster database system, in accordance with an embodiment of the present invention.

FIGS. 2-5 illustrate a cluster database system. FIGS. 2-5 provide an example of the changes that might occur in the database system during modification of a data block. As shown in FIG. 2, the system may include a plurality of database servers, or nodes, N1, N2, N3, N4, M. The nodes N1, N2, N3, N4, M may be connected to each other and to a database 200 via a network 202. The database 200 may contain a data block 204. One node, designated as M in FIG. 2, may be the Master node for the data block 204.

The data block 204 may have a timestamp associated with it. The timestamp is used to determine whether a copy of the data block 204 is current, i.e., conforms, with the version of the data block 204 stored in the database 200. In FIG. 2, the data block is marked with a timestamp of t=0.

Each of the nodes N1, N2, N3, N4, M may access the data block 204 using S locks and/or X locks. However, for the purposes of illustration, it is assumed in this example that the Master lock M does not require an S lock or an X lock on the data block 204.

As shown in FIG. 2, one or more of the nodes N1, N2, N3, N4, M may have S locks on the data block 204. In the example provided, nodes N2 and N3 have S locks on the data block 204. When a node N1 wishes to obtain an X lock on the data block 204, a request for the X lock is sent to the Master node M.

Figure 3:
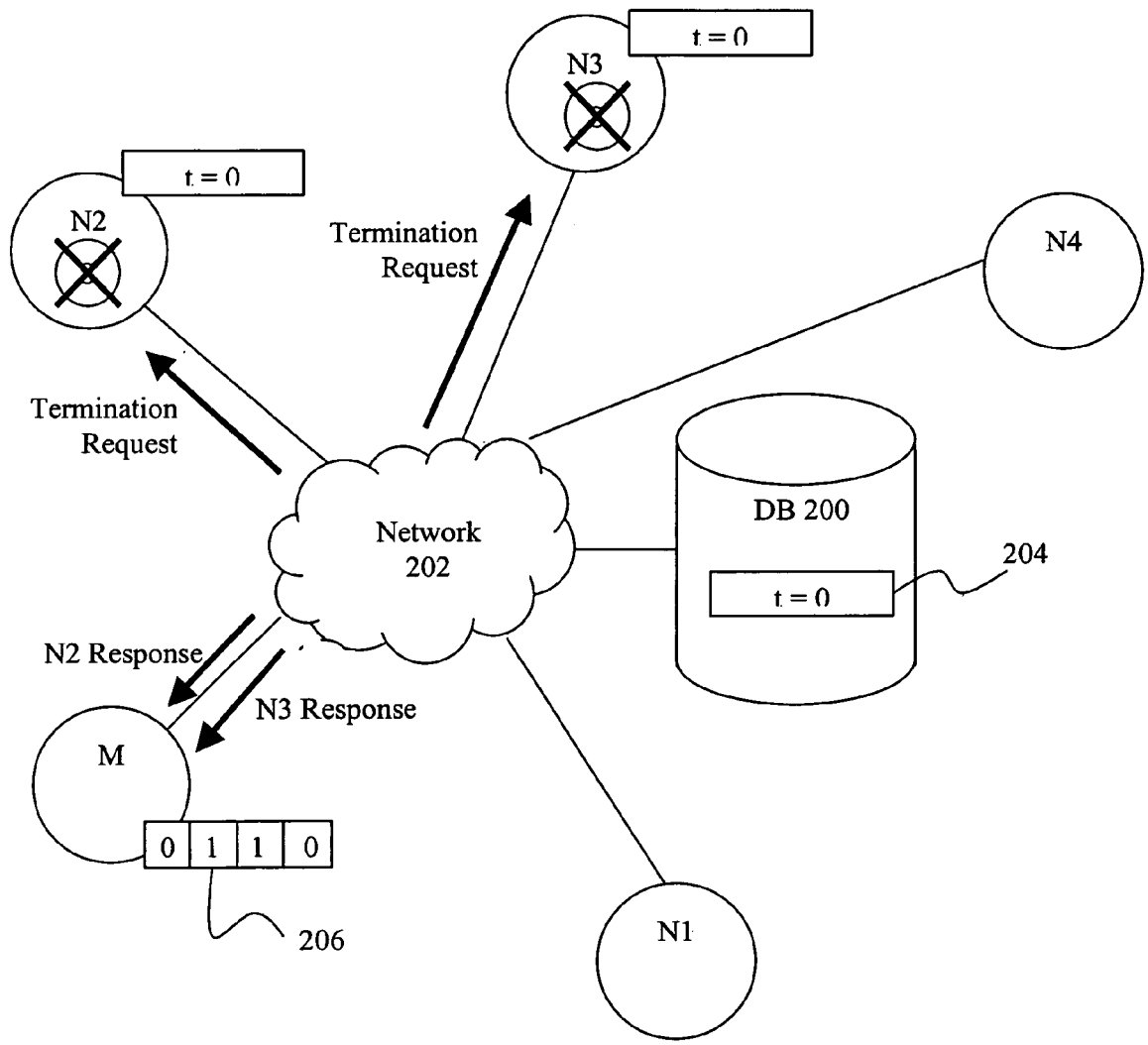
FIG. 3 is a block diagram illustrating a cluster database system, in accordance with an embodiment of the present invention.

Referring now to FIG. 3, when the master node M receives a request for the X lock, the Master node M sends requests to nodes N2, N3 to release their S locks. Each of the nodes N2, N3 obtains a copy of the data block 204 and stores the copy in the node's local cache. As shown in FIG. 3, nodes N2, N3 each obtain a copy of the data block with the current timestamp, labeled t=0.

Once the nodes N2, N3 have obtained copies of the data block, they release their S locks and transmit a response to the Master node M. The Master node M stores information describing which nodes have released their S locks. For example, the Master Node M may store this information in a bitmap 206.

In alternate embodiments, other nodes may compile and/or store the information describing which nodes have released their S locks. For example, the information may be compiled by the Master node M, and transmitted to each node N1, N2, N3, N4. As another example, the information may be compiled by the Master node M, and transmitted to the node which requested the X lock, N1. As another example, each node releasing an S lock may broadcast the information, and each node may compile the information received from all the nodes. As yet another example, each node may store information concerning whether it released an S lock, and no compilation of the information may occur. Other implementations will occur to those skilled in the art.

Figure 4:
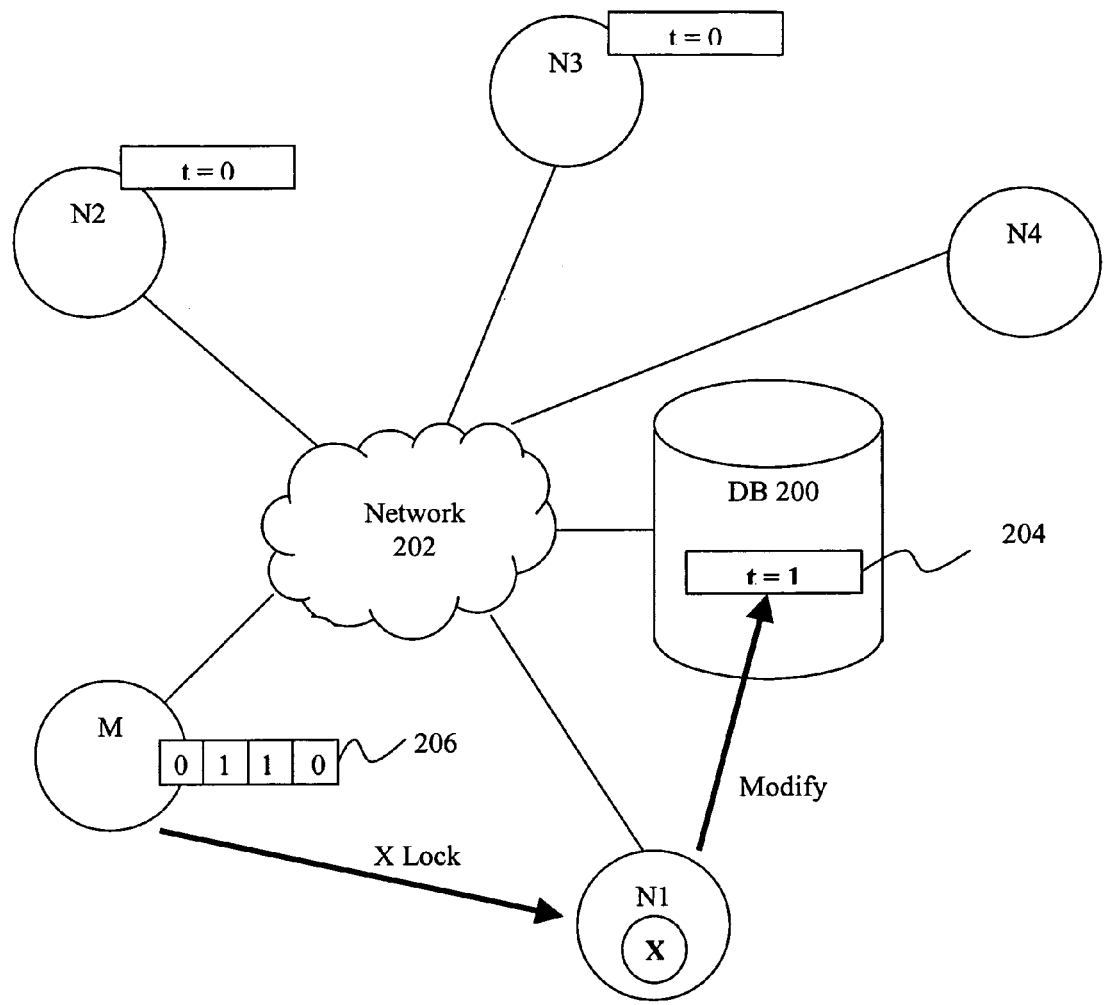
FIG. 4 is a flow chart illustrating a cluster database system, in accordance with an embodiment of the present invention.

As shown in FIG. 4, the Master node M may grant an X lock to node N1. In some implementations, the Master node M may also transmit to node N1 the bitmap 206 or other information identifying nodes that recently released their S locks.

Once node N1 is granted the X lock, the node N1 modifies the data block 204 in the database 200. The timestamp is incremented to indicate that the data block has been modified. As shown in FIG. 4, the timestamp is incremented to t=1.

Figure 5:
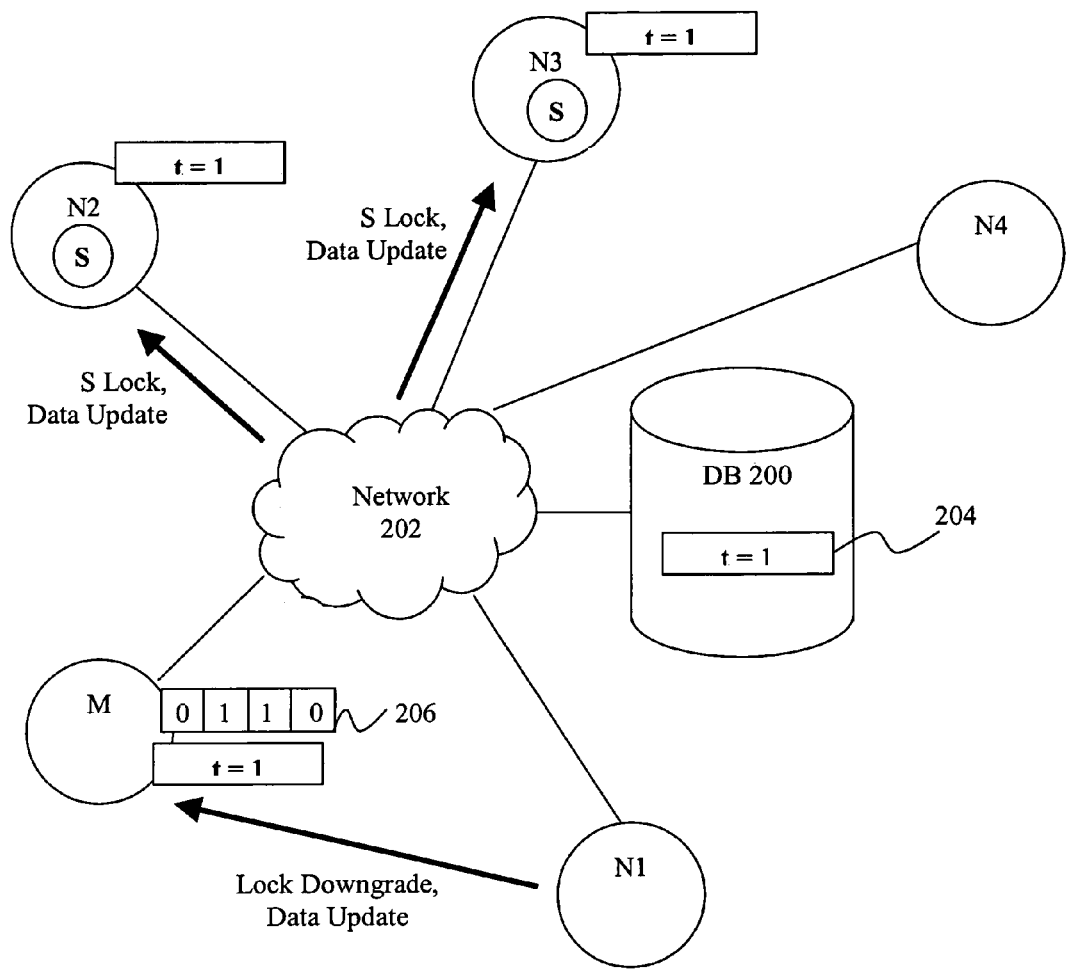
FIG. 5 is a flow chart illustrating a cluster database system, in accordance with an embodiment of the invention.
Figure 6:
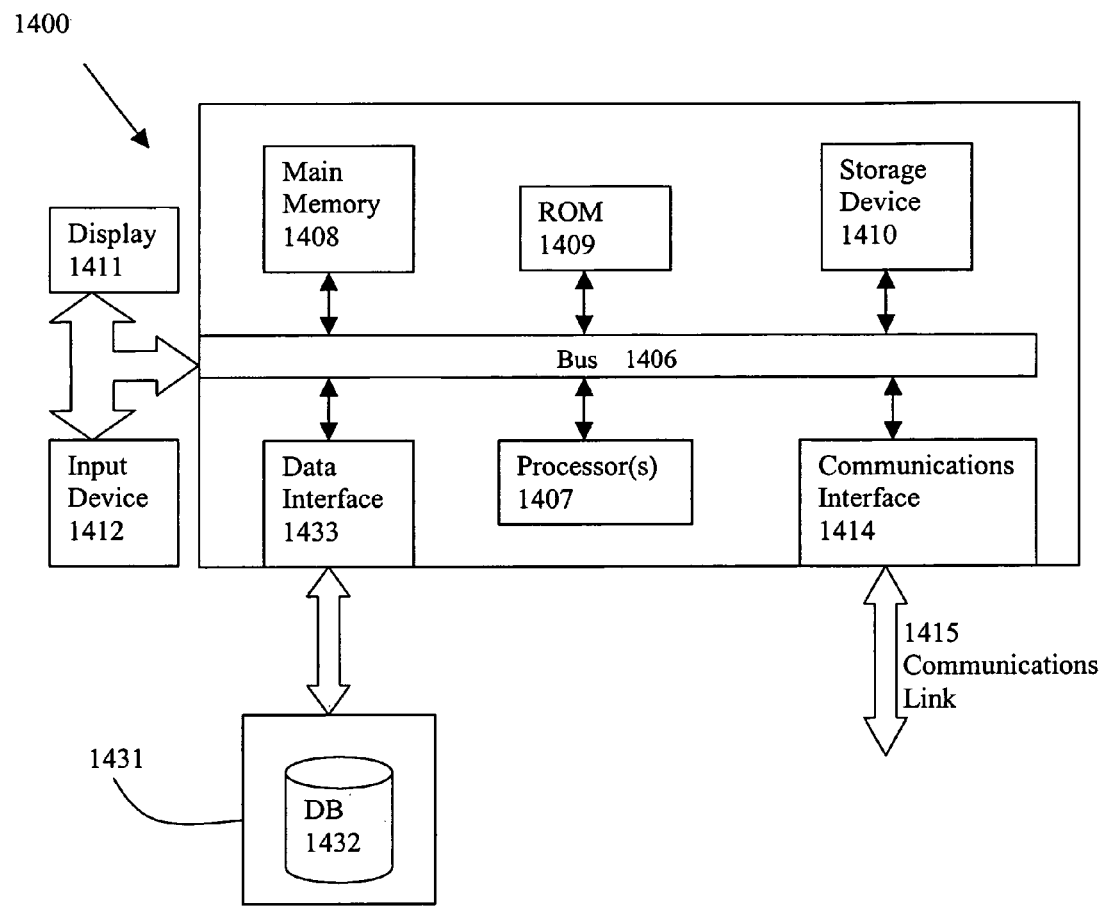
FIG. 6 illustrates a processing system in which embodiments of the invention may be practiced.

As shown in FIG. 5, as soon as the modification is complete, the X lock of node N1 may be downgraded to an S lock. Node N1 notifies the Master node M of the downgrade, and transmits a data update to the Master node M. In an alternative embodiment, the Master node M may request a data update from the database once the Master node M receives notification of the downgrade.

The Master node M consults the bitmap 206 or other appropriate information store to identify the nodes who released an S lock for the data block. In the example shown in FIG. 5, the Master node M identifies the nodes N2 and N3. The Master node M then grants an S lock to the identified nods, and also transmits the data update to the appropriate nodes.

In alternate implementations, nodes other than the Master node M are responsible for storing the bitmap 206 and transmitting the data update to the appropriate nodes. For example, if the node N1 stores the bitmap 206 or other identifying data, the node N1 may transmit the data update to the appropriate nodes N2, N3. As another alternative, each node in the system stores information concerning whether that node released an S lock. In this case, the data update may be broadcast to all the nodes, and the appropriate nodes may store the data update. Other implementations will occur to those skilled in the art.

The data update, describing the most recent version of the data with timestamp t=1, is transmitted to the appropriate nodes. Depending on how much data has been modified, the data update could include just the delta of the data block, or could include the entire data block.

If the changes to the data are relatively large, the data update may include the entire data block. However, if the changes to the data block are relatively small, the data update may include only the delta. Depending on the size of the data transmitted, interconnect channels may be used to transmit the modified data.

While the invention has been described in terms of X locks and S locks, other types of locks can be used. In particular, it is contemplated that other types of exclusive locks, shared locks, read locks, write locks, or other locks could be used in embodiments of the present invention.

System Architecture

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that cannot retain information in the absence of power, includes the main memory 1408. Transmission media includes coaxial cables, copper wire and fiber optics, including the wires that comprise the bus 1406.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A computer-implemented method for accessing shared data in a database system, comprising:
   identifying a desired data access protocol for providing access for a data item by determining whether to use a first data access protocol or a second data access protocol,
   wherein the first data access protocol is configured for allowing a first node to hold an exclusive lock for accessing of the data item until a sufficient number of other requests for access of the data item is received from one or more other nodes,
   wherein the second data access protocol comprises:
      requesting, at the first node, the exclusive lock for the data item;
      releasing, at a second node, a shared lock for the data item;
      granting the exclusive lock to the first node;
      modifying, by using a processor, the data item via the first node;
      releasing the exclusive lock by the first node after the act of modifying the data item is completed without requiring to wait for any other nodes to request access to the data item;
      transmitting a data update for the data item and granting the shared lock to the second node without receiving a request from the second node, wherein the data update is transmitted to the second node in response to the first node finishing the modification of the data item and releasing, at the first node, the exclusive lock for the data item;
   setting a field to indicate whether to use the first data access protocol or the second data access protocol for the data item; and
   storing the data update in a volatile or non-volatile computer-usable medium in the database system or displaying the data update on a display device.

2. The method of claim 1, further comprising:
   downgrading the exclusive lock to a shared lock at the first node without receiving a request from the second node.

3. The method of claim 1, further comprising:
   transmitting a shared lock to the second node without receiving a request from the second node.

4. The method of claim 1, wherein the data update comprises the modified data item.

5. The method of claim 1, wherein the data update comprises the modifications to the data item.

6. The method of claim 1, wherein the data update is transmitted via an interconnect channel.

7. The method of claim 1, further comprising:
   storing information identifying that the second node released the shared lock.

8. The method of claim 7, wherein the information is stored in a bitmap.

9. The method of claim 7, wherein the data update is transmitted to the second node based at least in part upon the stored information.

10. The method of claim 7, wherein a shared lock is transmitted to the second node based on the stored information.

11. A computer program product comprising a volatile or non-volatile computer usable medium having executable code to execute a process by using a processor for accessing shared data in a database system, comprising:
    identifying a desired data access protocol for providing access for a data item by determining whether to use a first data access protocol or a second data access protocol,
    wherein the first data access protocol is configured for allowing a first node to hold an exclusive lock for accessing of the data item until a sufficient number of other requests for access of the data item is received from one or more other nodes,
    wherein the second data access protocol comprises:
       requesting, at the first node, the exclusive lock for the data item;
       releasing, at a second node, a shared lock for the data item;
       granting the exclusive lock to the first node;
       modifying the data item via the first node;
       releasing the exclusive lock by the first node after the act of modifying the data item is completed without requiring to wait for any other nodes to request access to the data item;
       transmitting a data update for the data item and granting the shared lock to the second node without receiving a request from the second node, wherein the data update is transmitted to the second node in response to the first node finishing the modification of the data item and releasing, at the first node, the exclusive lock for the data item;
    setting a field to indicate whether to use the first data access protocol or the second data access protocol for the data item; and
    storing the data update in the database system or displaying the data update on a display device.

12. The computer program product of claim 11, wherein the process further comprises:
    downgrading the exclusive lock to a shared lock at the first node without receiving a request from the second node.

13. The computer program product of claim 11, wherein the process further comprises:
    transmitting a shared lock to the second node without receiving a request from the second node.

14. The computer program product of claim 11, wherein the data update comprises the modified data item.

15. The computer program product of claim 11, wherein the data update comprises the modifications to the data item.

16. The computer program product of claim 11, wherein the data update is transmitted via an interconnect channel.

17. A system for accessing shared data in a database system, comprising:
    a processor programmed for:
    identifying a desired data access protocol for providing access for a data item by determining whether to use a first data access protocol or a second data access protocol,
    wherein the first data access protocol is configured for allowing a first node to hold an exclusive lock for accessing of the data item until a sufficient number of other requests for access of the data item is received from one or more other nodes, wherein the second data access protocol comprises:
  requesting, at the first node, the exclusive lock for the data item;
  releasing, at a second node, a shared lock for the data item;
  granting the exclusive lock to the first node;
  modifying the data item via the first node;
  releasing the exclusive lock by the first node after the act of modifying the data item is completed without requiring to wait for any other nodes to request access to the data item;
  transmitting a data update for the data item and granting the shared lock to the second node without receiving a request from the second node, wherein the data update is transmitted to the second node in response to the first node finishing the modification of the data item and releasing, at the first node, the exclusive lock for the data item;
setting a field to indicate whether to use the first data access protocol or the second data access protocol for the data item; and
a volatile or non-volatile computer-usable medium in the database system for storing the data update or a display device for displaying the data update.

18. The system of claim 17, wherein the processor is further programmed for:
  downgrading the exclusive lock to a shared lock at the first node without receiving a request from the second node.

19. The system of claim 17, wherein the processor is further programmed for:
  transmitting a shared lock to the second node without receiving a request from the second node.

20. The system of claim 17, wherein the data update comprises the modified data item.

21. The system of claim 17, wherein the data update comprises the modifications to the data item.

22. The system of claim 17, wherein the data update is transmitted via an interconnect channel.

23. A computer-implemented method for accessing shared data in a database system, comprising:
  identifying a desired data access protocol for providing access for a data block by determining whether to use a first data access protocol or a second data access protocol,
  wherein the first data access protocol is configured for allowing a first node to hold an exclusive lock for accessing of the data block until a sufficient number of other requests for access of the data block is received from one or more other nodes,
  wherein the second data access protocol comprises:
  requesting, at the first node, the exclusive lock for the data block;
  releasing, at a second node, a shared lock for the data block;
  granting the exclusive lock to the first node;
  modifying, by using a processor, the data block via the first node;
  releasing the exclusive lock by the first node after the act of modifying the data block is completed without requiring to wait for any other nodes to request access to the data block;
  transmitting a data update for the data block and granting the shared lock to the second node without receiving a request from the second node, wherein the data update is transmitted to the second node in response to the act of modifying the data block and releasing, at the first node, the exclusive lock for the data block;
setting a field to indicate whether to use the first data access protocol or the second data access protocol for the data block; and
storing the data update in a volatile or non-volatile computer-usable medium or displaying the data update on a display device.

24. The method of claim 23, further comprising:
  downgrading the exclusive lock to the shared lock at the first node without receiving a request from the second node.

25. The method of claim 23, further comprising:
  transmitting a third lock to the second node without receiving a request from the second node.

26. The method of claim 23, wherein the data update comprises the modified data block.

27. The method of claim 23, wherein the data update comprises the modifications to the data block.

28. The method of claim 23, wherein the data update is transmitted via an interconnect channel.

29. The method of claim 23, further comprising:
  storing information identifying that the second node released the shared lock.

30. The method of claim 29, wherein the information is stored in a bitmap.

31. The method of claim 29, wherein the data update is transmitted to the second node based at least in part upon the stored information.

32. The method of claim 29, wherein a third lock is transmitted to the second node based at least in part upon the stored information.

33. A computer program product comprising a volatile or non-volatile computer usable medium having executable code to execute a process by using a processor for accessing shared data in a database system, comprising:
  identifying a desired data access protocol for providing access for a data block by determining whether to use a first data access protocol or a second data access protocol,
  wherein the first data access protocol is configured for allowing a first node to hold an exclusive lock for accessing of the data block until a sufficient number of other requests for access of the data block is received from one or more other nodes,
  wherein the second data access protocol comprises:
  requesting, at the first node, the exclusive lock for the data block;
  releasing, at a second node, a shared lock for the data block;
  granting the exclusive lock to the first node;
  modifying the data block via the first node;
  releasing the exclusive lock by the first node after the act of modifying the data block is completed without requiring to wait for any other nodes to request access to the data block;
  transmitting a data update for the data block and granting the shared lock to the second node without receiving a request from the second node, wherein the data update is transmitted to the second node in response to the act of modifying the data block and releasing, at the first node, the exclusive lock for the data block;
setting a field to indicate whether to use the first data access protocol or the second data access protocol for the data block; and
storing the data update or displaying the data update on a display device.

34. The product of claim 33, further comprising:
downgrading the exclusive lock to the shared lock at the first node without receiving a request from the second node.

35. The product of claim 33, further comprising:
storing information identifying that the second node released the shared lock.

36. A system for accessing shared data in a database system, comprising:
a processor programmed for:
identifying a desired data access protocol for providing access for a data block by determining whether to use a first data access protocol or a second data access protocol,
wherein the first data access protocol is configured for allowing a first node to hold an exclusive lock for accessing of the data block until a sufficient number of other requests for access of the data block is received from one or more other nodes,
wherein the second data access protocol comprises:
requesting, at the exclusive node, the first lock for the data block;
releasing, at a second node, a shared lock for the data block;
granting the exclusive lock to the first node;
modifying the data block via the first node;
releasing the exclusive lock by the first node after the act of modifying the data block is completed without requiring to wait for any other nodes to request access to the data block;
transmitting a data update for the data block and granting the shared lock to the second node without receiving a request from the second node, wherein the data update is transmitted to the second node in response to the act of modifying the data block and releasing, at the first node, the exclusive lock for the data block;
setting a field to indicate whether to use the first data access protocol or the second data access protocol for the data block; and
a volatile or non-volatile computer-usable medium in the cluster database system for storing the data update or a display device for displaying the data update.

37. The system of claim 36, wherein the processor is further programmed for:
downgrading the exclusive lock to the shared lock at the first node without receiving a request from the second node.

38. The system of claim 36, wherein the processor is further programmed for:
storing information identifying that the second node released the shared lock.

* * * * *

UNITED STATES PATENT AND TRADEMARK OFFICE
CERTIFICATE OF CORRECTION

| | | |
|---|---|---|
| PATENT NO. | : 7,921,090 B2 | Page 1 of 1 |
| APPLICATION NO. | : 11/450179 | |
| DATED | : April 5, 2011 | |
| INVENTOR(S) | : Ho et al. | |

It is certified that error appears in the above-identified patent and that said Letters Patent is hereby corrected as shown below:

In column 1, line 34, delete "a"shared"" and insert -- a "shared" --, therefor.

In column 1, line 34, delete "or"S"" and insert -- or "S" --, therefor.

In column 1, line 34, delete "an"exclusive"" and insert -- an "exclusive" --, therefor.

In column 2, line 65, delete "to"one" and insert -- to "one --, therefor.

In column 2, line 65, delete "or"an" and insert -- or "an --, therefor.

In column 3, line 1, delete "to"one" and insert -- to "one --, therefor.

In column 3, line 26, delete "entitled"Determining" and insert -- entitled "Determining --, therefor.

In column 3, line 63, delete "the"delta."" and insert -- the "delta." --, therefor.

Signed and Sealed this
Twenty-seventh Day of September, 2011

David J. Kappos
*Director of the United States Patent and Trademark Office*